Feb. 9, 1937.  H. C. SHAGALOFF  2,069,857
LIQUID FUEL BURNER
Filed Oct. 1, 1934   3 Sheets-Sheet 2

INVENTOR.
Harry C. Shagaloff
BY
his ATTORNEY.

Feb. 9, 1937.   H. C. SHAGALOFF   2,069,857
LIQUID FUEL BURNER
Filed Oct. 1, 1934   3 Sheets-Sheet 3

INVENTOR.
Harry C. Shagaloff
BY
J. E. Heath
his ATTORNEY.

Patented Feb. 9, 1937

2,069,857

UNITED STATES PATENT OFFICE 2,069,857

LIQUID FUEL BURNER

Harry C. Shagaloff, Evansville, Ind., assignor, by mesne assignments, to Servel, Inc., Dover, Del., a corporation of Delaware Application October 1, 1934, Serial No. 746,278

9 Claims. (Cl. 236—1)

My invention relates to a liquid fuel burner and more particularly to a liquid fuel burner for a continuous absorption refrigerator, and it is an object of my invention to provide improved automatic regulation of such burner.

My invention, together with the objects and advantages thereof, will fully appear upon reference to the following description and the accompanying drawings forming part of this specification and of which:

Figure 1:
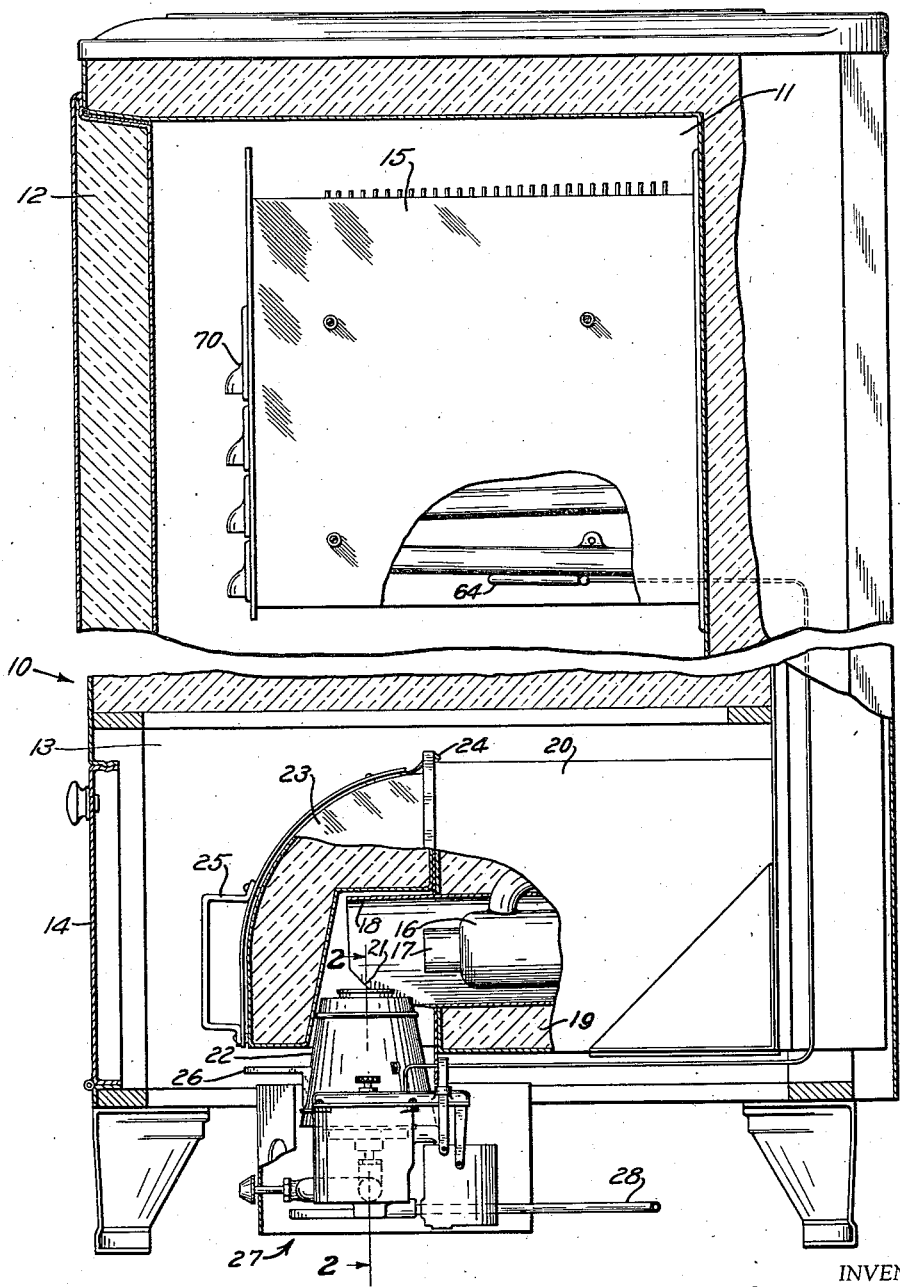
Fig. 1 is a broken side elevation, partly in vertical section, of a refrigerator embodying my invention.

Referring to Fig. 1 of the drawings, a refrigerator cabinet 10 provides a thermally insulated storage compartment 11 accessible by means of a door 12, and an apparatus compartment 13 accessible by means of a door 14. In the cabinet 10 there is mounted an absorption refrigeration apparatus unit generally of the type disclosed in Patent 1,609,334 to von Platen et al. and including an evaporator or cooling element 15 located in the storage compartment 11 and a generator having a horizontal portion 16 located in the apparatus compartment 13. The horizontal portion 16 of the generator is provided with an inner heating flue 17 and an outer heating flue 18, and is thermally insulated by a suitable material such as mineral wool 19 retained in place by a light sheet metal casing 20. The forward end of the outer generator heating flue 18 projects through the forward end of the casing 20 and beyond the end of the inner flue 17, and is provided with a suitable aperture 21 to receive the upper end of a burner chimney 22. The forward end of the outer flue 18 and the upper end of the burner chimney 22 are enclosed by a removable hood 23 which is retained in place by a suspension hook 24 and is provided with a suitable handle 25 for manipulation from the forward end of the apparatus compartment and which is accessible by means of the door 14. The burner chimney 22 is also removable for lighting and cleaning, being provided with a suitable handle 26 for ready manipulation. For a more detailed description of the cabinet and unit assembly, reference may be had to an application Serial No. 722,640 of William R. Hainsworth and an application Serial No. 734,075 of William R. Hainsworth.

A kerosene burner is indicated generally in Fig. 1 by the reference numeral 27 and is connected to receive kerosene from a storage tank, not shown, through a supply conduit 28. The structure of the burner will be more fully understood upon reference to the detail sectional views in Figs. 2, 3, and 4. The burner includes a body casing 29, which may be a machined casting, providing an inlet passage 30, a float chamber 31, and a passage 32. The kerosene supply conduit 28 is connected to one end of the inlet passage 30. Into the other end of the passage 30 is inserted a suitable bushing 33 having a valve passage 34 which provides communication from the inlet passage 30 toward the float chamber 31. The valve passage 34 opens from the inlet passage 30 into the interior of a flexible bellows 35, the lower end of which is secured to a shoulder on the bushing 33. In the other end of the bellows 35 is secured a member 36 forming a valve member 37 adapted to close the valve passage 34, and having an opening from the interior of the bellows 35 into the float chamber 31, which opening is formed by passages 38, 39, 40, and 41. The member 36 is guided for vertical movement in a plate 42 secured within the casing 29 by screws 43. A shoulder abutment of member 36 against the guide plate 42 limits the upward movement of member 36 under the resilient expansion of the bellows 35, and downward movement of member 36 is limited by the seating of the valve member 37 to close the valve passage 34, as hereinafter described. It will be understood that a spring may be used to augment the resiliency of the bellows 35. Within passage 40 of the member 36 is one end of a valve rod 44, forming a valve member 45 adapted to cooperate with the passage 39 to control flow of liquid therethrough. The upper end of the valve rod 44 is reciprocably guided in a tubular member 46 which is preferably formed integrally with the member 36 and is guided for vertical reciprocation in a bracket-like upward extension 47 of the plate 42. The upper end of the tube 46 is provided with a suitable cap plug 48.

Within the float chamber 31 is located a float 49 which may be, for instance, a hollow metal shell. The float 49 is secured to one forked end of a lever 50. The other end of the lever 50 is also forked and operatively associated with the valve rod 44, the prongs of the latter end extending into recesses 51 on opposite sides of the valve rod 44. The guide tube 46 is slotted to admit and permit movement of the lever 50. Between the end connected to the float 49 and the end connected to the valve rod 44, the lever 50 is pivoted at 52 on the lower part of a pivot post 53, so that upward movement of the float 49 causes downward movement of the valve rod 44 to close the valve 45. The valve 45 may therefore be referred to as a float valve.

At the upper end of the pivot post 53 are pivoted a lever 54 and a lever 55. The lever 54 overlies the float 49 and is adapted to rest on the float, whereby the weight of the lever 54 is added to the weight of the float. The lever 54 may therefore be referred to as a weight or weight lever. The outer end of the lever 55 extends into a slot 56 in the outer upturned end of the weight lever 54 and is normally urged upwardly by a spring 57. This spring is sufficiently strong to raise the weight lever 54 from the float 49.

Above the lever 55 is located an expansible diaphragm 58 of an expansible fluid thermostat. The expansible diaphragm 58 is centrally mounted on a resilient diaphragm 59 by means of a bushing 60. The diaphragm 59 is secured at its periphery under the edge of a first cover plate 61 secured on the casing 29, for instance, by means of screws 62. The expansible diaphragm 58 is connected by means of a capillary tube 63 to a sensitive bulb 64, forming an expansible fluid thermostat which contains a temperature sensitive fluid. As shown in Fig. 1, the sensitive bulb 64 of the thermostat is located in thermal conductive relation with the cooling element 15 in the storage compartment 11 of the refrigerator.

Figure 2:
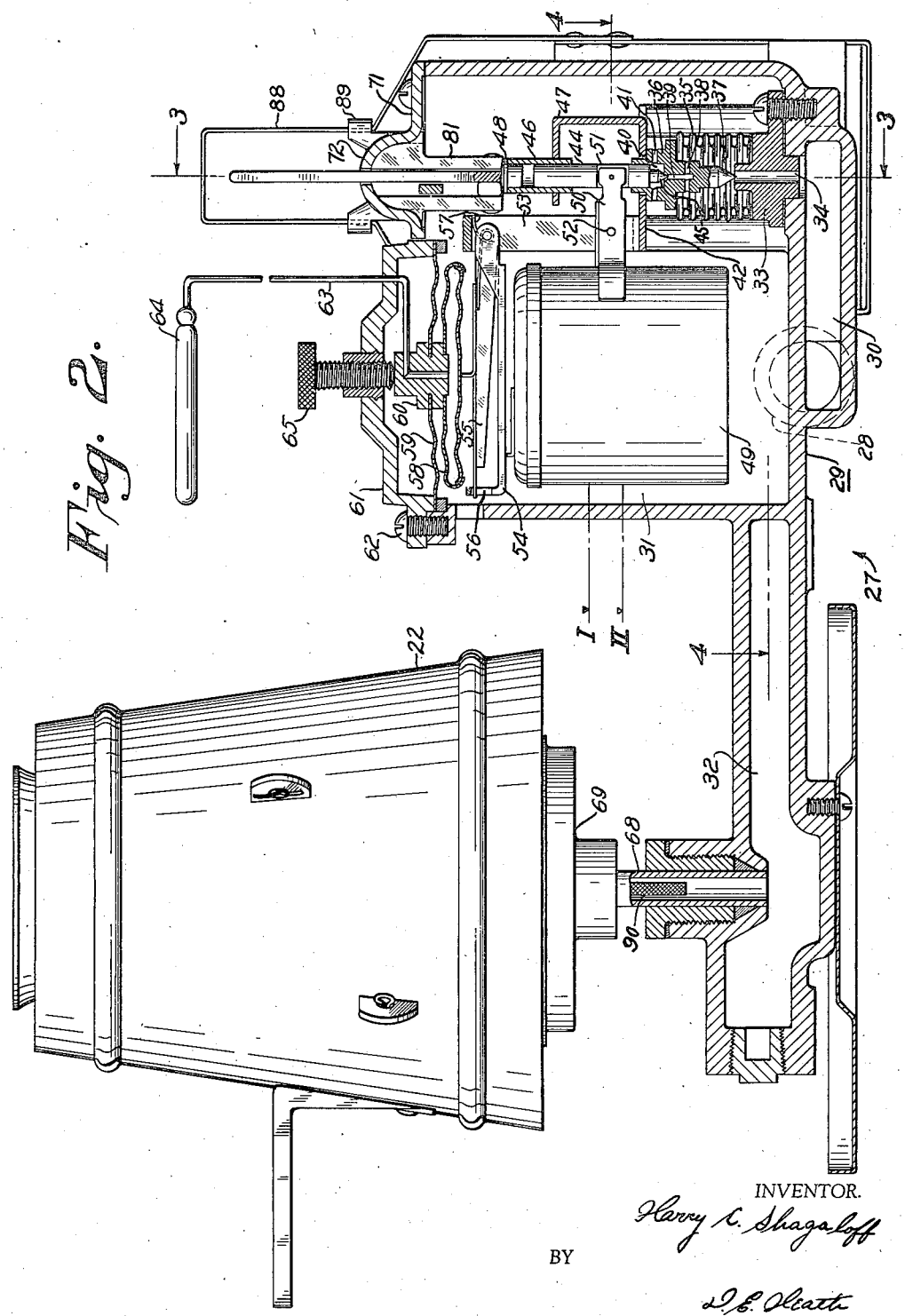
Fig. 2 is a detail section of a burner taken on line 2—2 in Fig. 1.

Upon increase of temperature of the cooling element 15, expansion of the thermostat diaphragm 58 occurs, and upon decrease in temperature of the cooling element 15, the thermostat diaphragm 58 contracts. The thermostat may be adjusted by a screw 65 threaded through the cover plate 61 and forming an adjustable abutment for the bushing 60. Upon expansion of the thermostat diaphragm 58, the lever 55 is moved downwardly against the action of spring 57, thus lowering and releasing the weight lever 54 upon the float 49. In Fig. 2, the diaphragm 58 is shown in its expanded position, whereby the weight lever 54 rests upon the float 49. The weighted float 49 is floated to close the valve 45 when liquid in the float chamber 31 reaches a level I. Upon decrease in temperature of the refrigerator cooling element 15, contraction of the thermostat diaphragm 58 occurs, whereupon lever 55, under the action of spring 57, engages and raises the weight lever 54 from the float 49. The valve 45 will now remain closed until the liquid in the float chamber 31 reaches a lower level II.

In operation of the device as thus far described, kerosene flows through the supply conduit 28, inlet passage 30, valve passage 34, past the normally open cut-off valve 37 into the bellows 35. From the latter, the kerosene flows through passage 38, passage 39, past the float valve 45, and through passages 40 and 41 into the float chamber 31. From the latter, kerosene flows through a valve opening 66 (Fig. 4), past a manually adjustable valve 67, and through passage 32 to a burner tube 68 which is connected to a burner well 69. Flow of kerosene continues until the level I is reached in the float chamber 31, assuming that the thermostat is expanded and the weight lever 54 is resting on the float 49. The flow of liquid from the float chamber 31 into the burner well passage 32 may be manually adjusted or cut off by the valve 67. Assuming that the burner has been lighted, heating of the refrigeration apparatus is commenced at a high burner flame for the reason that the liquid is at a high level in the burner tube 68. Upon operation of the refrigeration apparatus, the temperature of the cooling element 15 is reduced for cooling of air in the storage compartment 11 and freezing of water, for instance, in ice trays 70 (Fig. 1). When the temperature of the cooling element has been decreased a certain amount, depending upon the adjustment of the thermostat, the weight lever 54 is raised from the float 49, as previously described, and the level of liquid in the float chamber 31 and burner tube 68 recedes toward its minimum level II. As this level is approached, the burner flame decreases and heating of the generator of the refrigeration apparatus is reduced. Thus, the burner flame is automatically regulated responsive to the refrigeration temperature.

Figure 3:
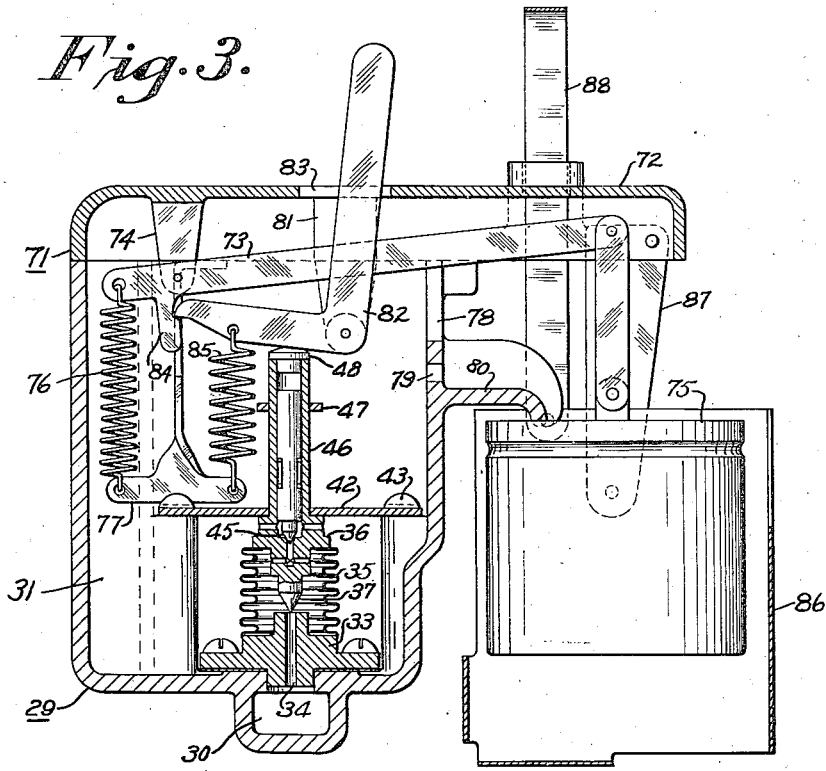
Fig. 3 is a vertical section taken on line 3—3 in Fig. 2.
Figure 4:
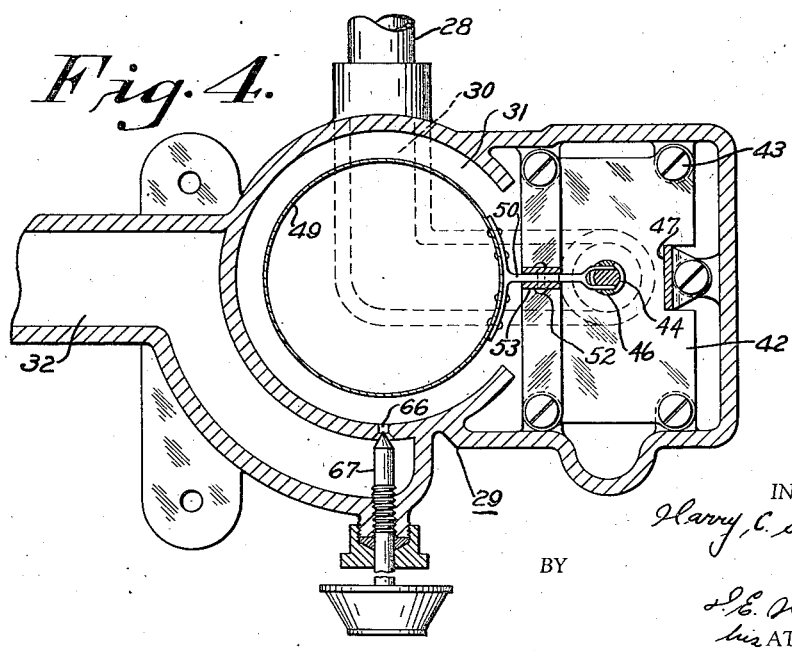
Fig. 4 is a horizontal section taken on line 4—4 in Fig. 2.

I will now describe further parts of the illustrated device which function to protect the burner in the case of overflow of liquid fuel as, for instance, upon sticking or otherwise faulty operation of the float valve. Referring to Figs. 2 and 3, the burner casing 29 is provided with a second cover plate 71 having an arch portion 72 which projects over one edge of the burner casing 29 (Fig. 3). Beneath the arch portion 72 of the cover plate 71 is a lever 73 which is pivoted near one end on a pivot post 74, the latter being preferably formed integrally with the cover plate 71. From one end of the lever 73, which extends beneath the arch 72 outside of the burner casing 29, is tiltably suspended a bucket 75. To the other, shorter end of the lever 73 is connected one end of a coil spring 76. The other end of the spring 76 is connected to a suitable spring post 77 which is secured to and extends downwardly from the cover plate 71. The spring 76 exerts a downward tension on the short end of the lever 73 so that the longer end of the lever 73 and the bucket 75 are normally maintained in and biased to an elevated position. The lever 73 may be referred to as a bucket lever. The burner casing 29 is provided with a suitable slot 78 to allow vertical oscillation of the bucket lever 73, as hereinafter described. At a level slightly above the safe maximum level of liquid in the float chamber 31, the burner casing 29 is provided with an opening 79. On the exterior of the burner casing 29, beneath the opening 79, is a spout 80 which is preferably formed integrally with the casing 29. The spout 80 is directed into the open top of the bucket 75, so that liquid overflowing from the float chamber 31 through the opening 79 will be directed by the spout 80 into the bucket 75.

On another pivot post 81, which is also preferably formed integrally with the cover plate 71, there is pivoted a bellcrank lever 82. One end of the bellcrank 82 extends upwardly through slot 83 in the arch 72 of the cover plate 71. The other end of the bellcrank 82 is formed as a trigger which is adapted to be engaged by a catch 84 on the bucket lever 73 when the latter is in its elevated or normal position. The trigger end of the bellcrank 82 overlies the tubular guiding member 46 and abuts downwardly on the cap plug 48 in the upper end of the tube 46. The trigger end of the bellcrank 82 is placed under tension by means of a coil spring 85 having one end connected to the bellcrank and the other end connected to the spring post 77. In the position shown in Fig. 3, the catch 84 detains the bellcrank 82 against the action of the spring 85 in such position that no downward force is exerted by the bellcrank 82 on the tube 46.

If, during operation of the burner, liquid fuel should rise in the float chamber 31 beyond a predetermined safe maximum level, as upon sticking or otherwise faulty operation of the float valve 45, the liquid overflows through opening 79 and is directed by the spout 80 into the bucket 75. When the added liquid increases the weight of the bucket 75 sufficiently to overcome the tension of spring 76, the bucket 75 and the bucket lever 73 move from their normal elevated position to a lower position. This movement of the bucket lever 73 releases engagement of the catch 84 with the trigger end of the bellcrank 82. Thereupon, the spring 85 exerts a downward force on the trigger end of the bellcrank 82 against the upper end of the previously mentioned guide tube 46 which is vertically reciprocable in the plate 42 and its bracket-like extension 47. Under the force exerted by the spring 85, the tube 46 and the member 36 are moved downwardly against the resiliency of the bellows 35 until the valve member 37 seats at the upper end of the passage 34, shutting off flow of liquid fuel through the latter.

Around the trip bucket 75 is a guard casing 86 which is pivoted on a pivot post 87 which depends from the projecting arch portion 72 of the cover plate 71. A handle 88 is guided for vertical reciprocation by members 89 which are preferably formed integrally with the projecting arch portion of the cover plate 71. The lower ends of the handle 88 are pivotally connected to the bucket guard 86. Upon operation of the safety device, the bucket 75 has descended into the guard 86 in such manner that tipping of the guard causes tipping of the bucket. The guard 86, and consequently the bucket 75 may be tipped by pressing downwardly on the handle 88 which turns the guard 86 around its pivot on the pivot post 87. In this manner the overflow liquid may be emptied from the bucket 75 after operation of the safety device. After the bucket is emptied, the device may be reset by moving the projecting end of the bellcrank 82 to raise the trigger end thereof against the action of the spring 85, until the trigger end is again engaged by the catch 84 on the bucket lever 73 which has been returned to its normal position upon emptying of the bucket. The member 36 and guide tube 46, now relieved from the downward force exerted by the spring 85, are raised to the previously described normal or inoperative position by the resiliency of the bellows 35, and auxiliary spring if such be used, and the valve member 37 opens the passage 34, and the normal, previously described operation of the burner may be resumed. If the burner flame has become extinguished, it will be necessary to relight the burner.

Lighting of the burner may be accomplished by closing the manually adjustable valve 67, priming the burner well 69 with liquid fuel if necessary, the chimney 22 being removed for this purpose, and applying a flame to a burner lighting wick. In Fig. 2 is shown the lower end of a wick 90 which is provided to sustain combustion in the burner well 69 at low liquid levels. When such a wick is provided, it may be also used for lighting the burner. When the burner flame has become uniform and smokeless, the chimney 22 is replaced and the valve 67 opened to permit the previously described normal operation of the burner. The valve 67 may be advantageously adjusted to control the flow of liquid from the float chamber 31 to the burner tube 68 by way of the burner passage 32 to determine the size of the burner flame for a given liquid level in the float chamber.

What I claim is:

1. A kerosene burner for a continuous absorption refrigerator including a burner well, a float chamber, a valve for regulating inlet of kerosene to said float chamber and burner well, a float in said float chamber operatively connected to said valve, a first lever overlying and adapted to rest upon said float, a second lever operable to engage and disengage said first lever to respectively raise and lower said first lever with respect to said float, a spring urging said second lever to engage and raise said first lever from said float, and an expansible fluid thermostat arranged to move said second lever against the action of said spring to lower and disengage said first lever upon said float responsive to increase in temperature.

2. A kerosene burner for a continuous absorption refrigerator including a valve for controlling flow of kerosene to said burner, a float for operating said valve responsive to liquid level of kerosene in the burner, a first lever overlying and adapted to rest upon said float, a second lever operative to engage and disengage said first lever to respectively raise and lower said first lever with respect to said float, means urging said second lever to engage and raise said first lever from said float, and an expansible fluid thermostat arranged to move said second lever against the action of said means to lower and disengage said first lever upon said float responsive to increase in temperature.

3. A kerosene burner for a continuous absorption refrigerator including a fuel control valve, a float for operating said valve, a weight adapted to rest upon said float, a lever operative to engage and disengage said weight to respectively raise and lower said weight with respect to said float, means urging said lever to engage and raise said weight from said float, and a thermostat arranged to move said lever against the action of said means to lower and disengage said weight upon said float responsive to increase in temperature.

4. A kerosene burner for a continuous absorption refrigerator including a fuel control valve, a float, a first means operatively connecting said valve to said float, a weight adapted to rest upon said float, a second means normally operative to remove said weight from said float, and a thermostat arranged to modify the operation of said second means to rest said weight upon said float responsive to increase in temperature.

5. A liquid fuel burner including a fuel control valve, a float, a first means operatively connecting said valve to said float, a weight, and a second means to automatically add said weight to said float and remove the weight from the float responsive to changes in temperature.

6. A liquid fuel burner in which the heat produced varies with the level of liquid fuel in the burner and including a fuel control valve, a float, a first means operatively connecting said valve to said float, and a second means operative to vary the weight of said float and thereby vary the liquid level in said burner responsive to changes in temperature.

7. A liquid fuel burner, means for supplying liquid fuel to said burner, a float adapted to be buoyed by liquid fuel flowing to said burner, a valve for controlling flow of liquid fuel to the burner, a first means operatively connecting said valve to said float, and thermostatically operable means for adjustably weighting said float.

8. A liquid fuel burner in which the heat produced varies with the level of liquid fuel in the burner and including a valve for controlling flow of liquid fuel to the burner, a float, a first means operatively connecting said valve to said float, and a second means for adjusting the weight of said float.

9. A liquid fuel burner for an absorption type refrigerator including a fuel control valve, a float, means operatively connecting said valve to said float, a weight adapted to rest upon said float, a second means to engage and disengage said weight to respectively raise and lower said weight with respect to said float, and a thermostat arranged to operate said second means to lower and disengage said weight upon said float responsive to increase in temperature.

HARRY C. SHAGALOFF.